UNITED STATES PATENT OFFICE.

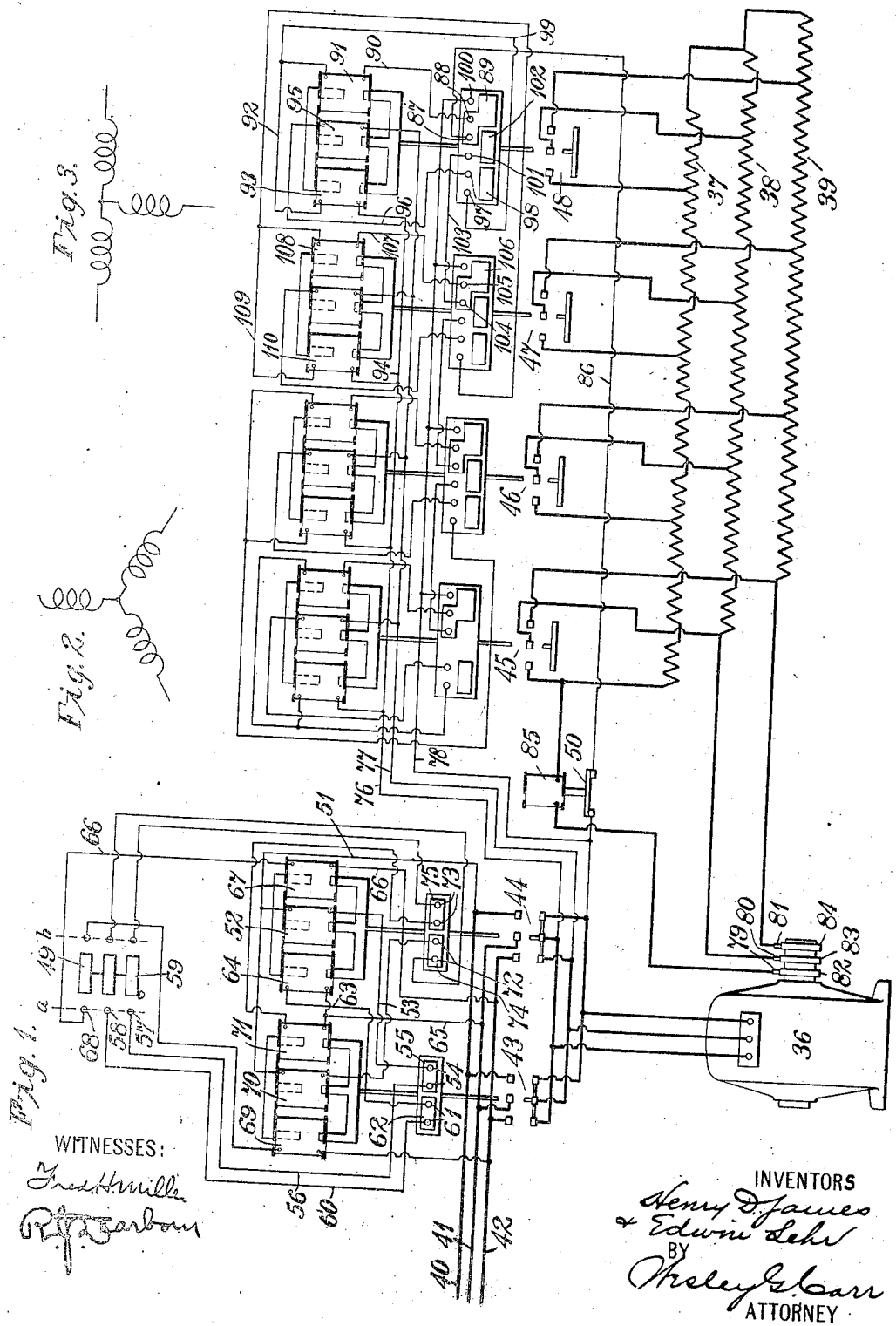

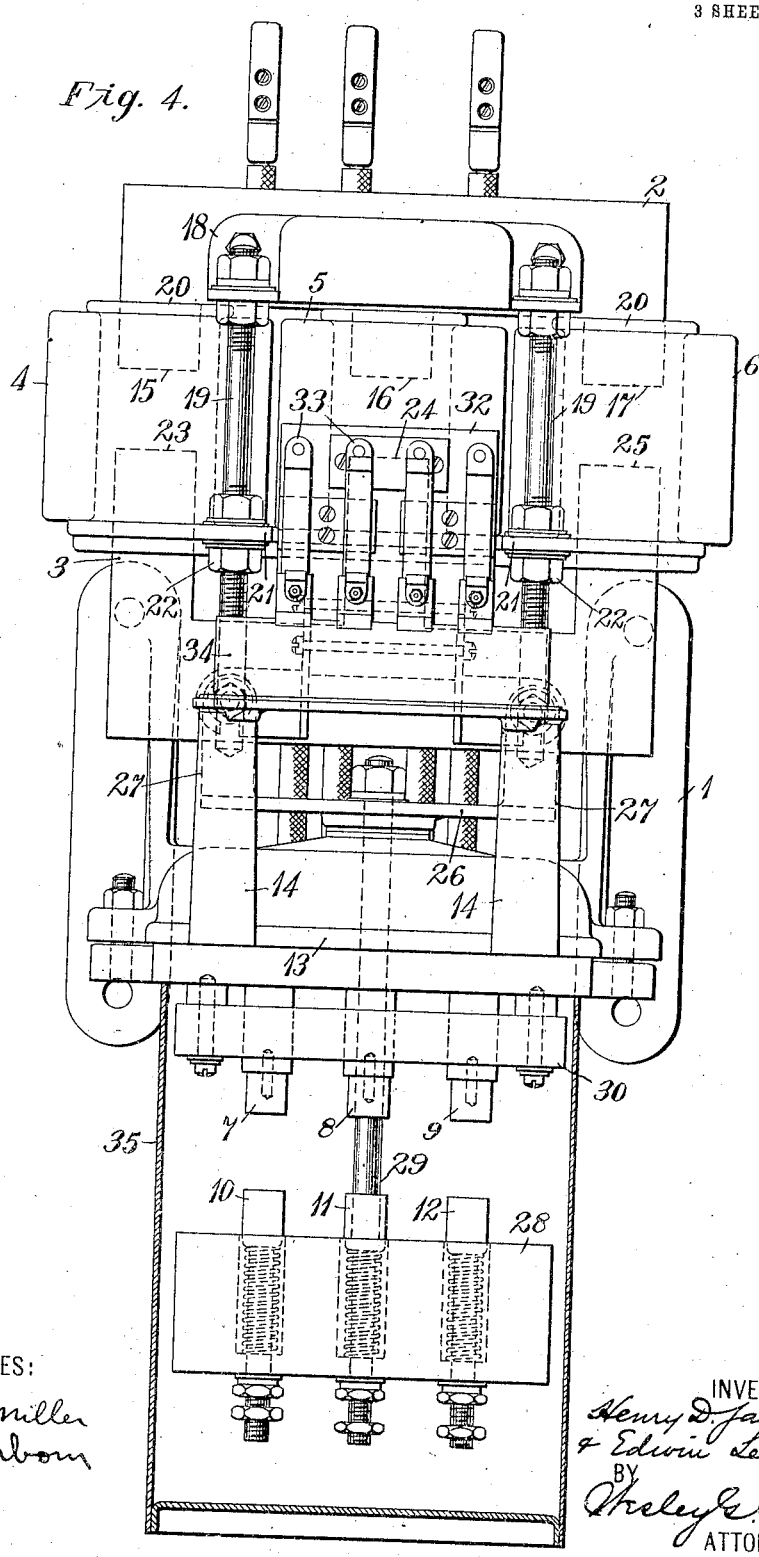

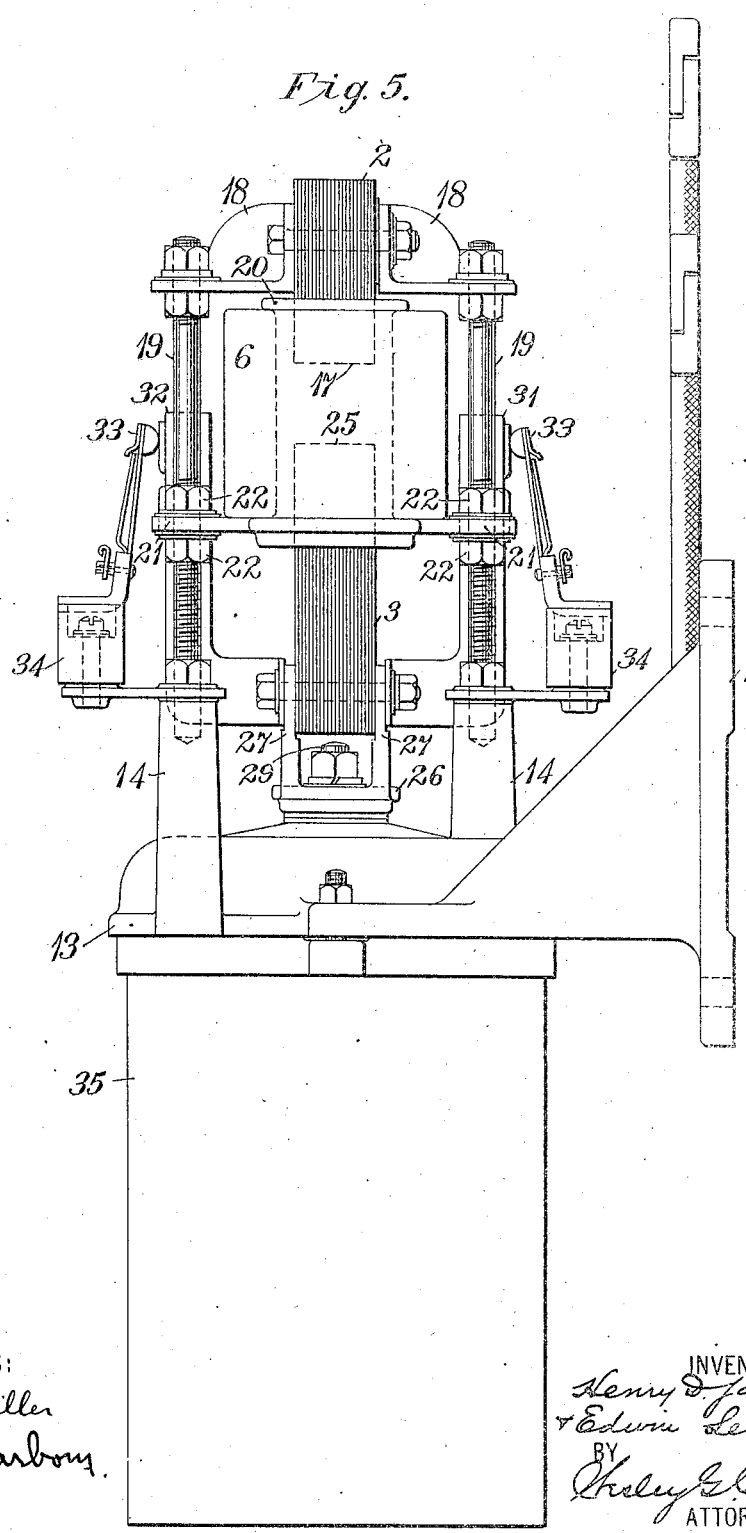

HENRY D. JAMES, OF PITTSBURG, AND EDWIN LEHR, OF WILKINSBURG, PENNSYLVANIA, ASSIGNORS TO WESTINGHOUSE ELECTRIC & MANUFACTURING COMPANY, A CORPORATION OF PENNSYLVANIA.

SYSTEM OF ELECTRIC-MOTOR CONTROL.

992,202.  Specification of Letters Patent.  Patented May 16, 1911.

Application filed September 3, 1907. Serial No. 391,250.

*To all whom it may concern:*

Be it known that we, HENRY D. JAMES and EDWIN LEHR, citizens of the United States, and residents, respectively, of Pittsburg and Wilkinsburg, both in the county of Allegheny and State of Pennsylvania, have invented a new and useful Improvement in Systems of Electric-Motor Control, of which the following is a specification.

Our invention relates to systems of electric motor control, and has special reference to such systems as embody a plurality of independently-operated switches for starting polyphase induction motors.

The objects of our invention are to provide an improved electro-responsive switching device that shall be specially adapted to receive energy for its operation from an alternating current source and a system embodying switches for determining the direction of rotation of an induction motor and for gradually and automatically decreasing its secondary resistance.

Electrically operated switches which are operated by energy received from an alternating current source have usually been unsatisfactory, to a greater or less degree, by reason of the chattering noise which was produced between and in the magnetizable core members.

According to our present invention, we employ electrically operated switches each of which is provided with a plurality of actuating magnets, the windings of which are supplied with currents of different phases whereby the noise incident to the single-phase magnets is avoided, and we also provide means having a relatively simple system of control circuits and dependent upon the current supplied to the motor for automatically delaying the reduction of its secondary resistance without necessitating the use of an independent source of supply for said circuits.

Figure 1, of the accompanying drawings, is a diagrammatic view of a control system arranged in accordance with our invention. Figs. 2 and 3 are diagrams which show the phase relations of the operating magnet windings for the reversing and accelerating switches. Figs. 4 and 5 are, respectively, a front and a side elevation of a polyphase switching device which may preferably be employed in the system shown in Fig. 1.

Referring to the drawings, with special reference to Figs. 4 and 5, the device here illustrated comprises a supporting frame or bracket 1, a stationary core member 2, a movable core member 3, magnet windings 4, 5, and 6, stationary contact members 7, 8, and 9, and movable contact members 10, 11, and 12. The frame 1 is adapted to be secured to a vertical plane surface and is provided with an annular horizontal portion 13 having posts 14 which project upwardly therefrom.

The stationary core member 2 is preferably constructed of laminated iron and comprises an oblong block having projections 15, 16, and 17, and end frames 18 which hold the laminæ together and serve to support the core structure, bolts 19 forming a rigid connection between the posts 14 and the end frames. The coils 4, 5, and 6 are wound on spools 20 which are fitted over the legs of the stationary core member and are held in position by projecting ears 21 which are secured by set nuts 22 to the rods 19.

The movable core member 3 is similar to the stationary core member 2 except that its legs 23, 24, and 25 are longer, thereby permitting a considerable separation between the core members without moving the legs of the movable member out of the spools 20, which serve as guides and prevent the lateral displacement of the movable member. The movable member is also laminated and is provided with an end frame which comprises a cross strip or plate 26 perpendicular to the line of motion of the movable member, and projecting ears 27 between which the laminæ are supported.

The movable contact members 10, 11, and 12 are resiliently secured to an insulating plate 28 and are operatively connected to the movable core member by a rod 29 which is bolted to the plate 28 at one end and to the cross strip or plate 26 at the other.

The stationary contact members are secured to an insulating plate 30 which is affixed to the annular portion 13 of the supporting frame 1 and forms, together with the supporting frame, a bearing for the rod 29.

Auxiliary contact-bearing members 31 and 32 are secured to the movable contact member 3 so that the motion of the latter is imparted to them, and coöperating stationary contact fingers 33 are mounted on insulating blocks 34 which are supported by the posts 14.

The main stationary and movable contact members are preferably immersed in oil, or some other insulating fluid, which may be contained in a tank or casing 35.

Special reference may now be had to Figs. 1, 2, and 3, in which a three-phase induction motor 36, having secondary resistance sections 37, 38, and 39, is supplied with energy from any suitable source through line conductors 40, 41, and 42, the direction of rotation of the motor and the amount of resistance included in the secondary circuit being determined by a plurality of independently-operated control switches 43, 44, 45, 46, 47, and 48 that are governed by a master controller 49.

In starting the motor, it is desirable to delay the short-circuiting of the secondary resistance in order to protect the motor from injury by supplying excessive currents to its primary winding. This result is accomplished by a limit switch 50 which is adapted to suspend the acceleration until the current traversing the motor secondary circuit falls below a predetermined amount.

The operation of the system is as follows: Assuming that the limit switch 50 is closed, and that the control switches are open, as illustrated in Fig. 1 of the drawings, if the master controller 49 is moved from its "off" position to position $a$, a control circuit is first completed from line conductor 40 through conductors 51, magnet winding 52 of the switch 44, conductor 53, contact terminals 54 (which are bridged by contact member 55 when the switch 43 is open), conductor 56, contact terminals 57 and 58 (which are bridged by contact member 59 of the master controller 49), conductor 60, contact terminals 61 (which are bridged by contact member 62 when the switch 43 is open), conductor 63, magnet winding 64, and conductor 65 to the line conductor 41. The line conductor 42 is connected by a conductor 66 and magnet winding 67 to a contact finger 68 of the master controller which also engages contact member 59. The three coils 52, 64 and 67 are thus connected in Y across the three-phase circuit. When the master controller 49 occupies the position $b$, magnet windings 69, 70, and 71 of the switch 43 are similarly connected, as shown in Fig. 2. When energized, the magnet windings 52, 64 and 67 close the switch 44 and establish a circuit from the line conductors 40, 41, and 42 to the motor 36. The control circuits for the magnet windings 69, 70, and 71 are established through a plurality of contact terminals 72 and 73 (which are only bridged by contact members 74 and 75 when the switch 44 is open), consequently, it is impossible to close both of the switches 43 and 44 at the same time or to effect the closure of one unless the other is open. When the switch 43 is closed, a circuit is also established from supply line conductors 40, 41, and 42 to the motor 36, but one phase of the motor winding is reversed in order to effect the reverse rotation of the motor, according to well known principles. Supply conductors 76, 77, and 78 are connected to the motor circuit between the switch 44 and the motor so that they are completely deënergized when the main reversing switches 43 and 44 are open without necessitating the use of auxiliary or relay contact members.

The motor 36 is provided, as above stated, with secondary resistances 37, 38, and 39 which are star-connected, their outer extremities being connected to the motor secondary through stationary contact fingers 79, 80, and 81, which engage collector rings 82, 83, and 84 that are carried by the rotatable member of the machine. The resistance section 37 is connected to the terminal 79, through a magnet winding 85 of the limit switch 50. The secondary resistance sections are substantially equal, so that the electric currents supplied to the respective sections are substantially the same, and if this value exceeds a predetermined amount, the magnet winding 85 will be sufficiently energized to open the limit switch 50.

When the acceleration of the motor has increased and the current traversing the secondary circuits has fallen below a predetermined amount, limit switch 50 will close and a control circuit is then completed from line conductor 40 through switch 44, limit switch 50, conductor 86, contact terminals 87 and 88 (which are bridged by contact member 89 when the switch 48 is open), conductor 90, magnet winding 91, conductor 92, magnet winding 93, and conductor 94 to the line conductor 76. The magnet windings 91 and 93 are thus connected in series between two of the line conductors and sufficient energy is provided in this way to close the switch 48. As soon as the switch is closed, however, a third magnet winding 95 is connected to an intermediate point between the other two windings, as shown in Fig. 3, circuit connections being then established from the control conductor 77 through this magnet winding, conductor 96, contact-terminals 97 (which are bridged by contact member 98 when the switch 48 is closed), and conductor 99 to the junction of the magnet windings 91 and 93. The circuit for the magnet windings 91 and 93, which are connected in series, is so changed when the switch 48 is closed as to exclude the limit switch 50, circuit connections being then established from the line conductor 40 through control conductor 78, contact terminals 100, and 88 (which are bridged by contact member 89)

to conductor 90, from which point circuit is completed, as above indicated. The circuit which was first established through the limit switch is now continued from conductor 86 through contact terminals 87 and 101 (which are now bridged by contact member 102,) conductor 103, contact terminals 104 and 105 (which are bridged by contact member 106 when the switch 47 is open), conductor 107, magnet winding 108, conductor 109, magnet winding 110 and conductor 94 to the control conductor 76. In this way, the switch 47 is closed as soon as the limit switch is again dropped, after a portion of the resistances becomes short-circuited by the closure of the switch 48, the magnet windings of switch 47 being then connected, as were those of the switch 48 and in like manner, and the switches 46 and 45 being successively closed, if permitted by the limit switch 50, until the resistance sections 77, 78, and 79 are completely short-circuited.

One of the principal advantages in the system of our invention lies in the fact that the magnet windings for the control switches are all deënergized as soon as the reversing switches are open and without the use of auxiliary or relay contact members, consequently, it is possible to provide for the extinguishing of electric arcs at the terminals of the reversing switches which serve as main circuit interrupters.

The complete system is arranged in a very simple manner with a minimum number of control circuits. It will also be observed that only a single circuit is interrupted by the limit switch so that this switch becomes materially simplified over those of the prior art, which are adapted for the same purpose.

As already pointed out, the switches themselves are admirably adapted for the work for which they are intended, and the noise which usually accompanies the use of alternating current switches is entirely avoided.

While we have shown and described a three-phase motor, we do not wish to limit our invention to a three-phase system, and we also desire to secure for ourselves such variations in the details of the switch and in the circuit connections of the system as may be effected within the scope of our invention.

We claim as our invention:

1. In a control system, the combination with a three-phase motor, a pair of independently-operated reversing switches, a secondary resistance, and a plurality of independently-operated control switches for short-circuiting the resistance, magnet windings connected in polyphase relation for actuating each of the reversing switches, a plurality of magnet windings connected in series relation for actuating each of the resistance switches, and control circuits for the resistance switches that are completed through the main contacts of the reversing switches.

2. In a control system, the combination with a plurality of independently-operated switches, and a plurality of magnet windings for each switch, of means for initially actuating the switches from a single-phase source and for automatically connecting the coils of each switch in polyphase relation when said switches close.

3. In a control system, the combination with a plurality of independently-operated switches that are adapted to close in a predetermined sequence, a group of three actuating magnets for each switch, of means for successively closing the switches by initially connecting two of the operating magnet windings in series across a single-phase source of energy and for automatically connecting the three magnet windings in polyphase relation as each switch is closed.

4. In a control system, the combination with a motor, a resistance, and a plurality of resistance control switches having a group of actuating magnet windings, of means for connecting some of the switch coils in series relation across a single-phase circuit and for connecting all of the magnet windings in a polyphase relation as each switch is closed, and means for automatically delaying the initial energizing of the electro-magnet until the current traversing the motor circuit falls below a predetermined amount.

5. In a control system, the combination with a three-phase motor, a pair of independently-operated reversing switches, a secondary resistance, a plurality of independently-operated control switches for short-circuiting the resistance, and a plurality of magnet windings for actuating each of the reversing and control switches, of means for successively actuating the switches by initially connecting two of the magnet windings in series relation across one phase of the motor circuit as the current traversing the motor supply circuit falls below a predetermined amount and for finally connecting the three coils in polyphase relation as each switch is closed.

6. In a control system, the combination with a three-phase motor, a pair of independently-operated reversing switches, a secondary resistance, a plurality of independently-operated control switches for short-circuiting the resistance, and a plurality of magnet windings for actuating each of the reversing and control switches, of means for successively actuating the switches by initially connecting two of the magnet windings in series relation across one phase of the motor circuit, a limit switch dependent upon the current traversing the secondary circuit of the motor for automatically delaying the initial actuation of the switches, and means for finally connecting the three magnet windings in polyphase relation as each switch is closed.

7. An electrically-operated switch comprising stationary and movable core members each of which has three projections, and coils mounted on the projections of the stationary member, stationary contact members, movable contact members connected to the movable core member, auxiliary contact-bearing members operatively connected to the movable members and stationary contact fingers which coöperate therewith.

8. An electrically-operated switch comprising stationary and movable core members, polyphase operating magnet windings therefor, stationary contact members, movable contact members operatively connected to the movable core member, auxiliary contact members secured to the movable parts and coöperating contact fingers secured to the stationary parts.

In testimony whereof, we have hereunto subscribed our names this 24th day of August, 1907.

HENRY D. JAMES.
EDWIN LEHR.

Witnesses:
H. A. STEEN,
BIRNEY HINES.